(12) United States Patent
Geddes (10) Patent No.: US 11,598,103 B2
(45) Date of Patent: Mar. 7, 2023

(54) BUILDING PANEL (71) Applicant: Gordon Andrew Geddes, South Windsor (AU)

(72) Inventor: Gordon Andrew Geddes, South Windsor (AU)

(*) Notice: Subject to any disclaimer, the term of this patent is extended or adjusted under 35 U.S.C. 154(b) by 0 days.

(21) Appl. No.: 16/972,796

(22) PCT Filed: Jun. 7, 2019

(86) PCT No.: PCT/AU2019/050588
§ 371 (c)(1),
(2) Date: Dec. 7, 2020

(87) PCT Pub. No.: WO2019/232590
PCT Pub. Date: Dec. 12, 2019

(65) Prior Publication Data
US 2021/0246662 A1    Aug. 12, 2021

(30) Foreign Application Priority Data
Jun. 7, 2018   (AU) ................................ 2018902054

(51) Int. Cl.
*E04F 13/08* (2006.01)
*H02S 20/23* (2014.01)
*E04C 2/34* (2006.01)

(52) U.S. Cl.
CPC .......... *E04F 13/0807* (2013.01); *H02S 20/23* (2014.12); *E04C 2/34* (2013.01); *E04F 2201/0146* (2013.01); *E04F 2201/043* (2013.01); *E04F 2201/0517* (2013.01)

(58) Field of Classification Search
CPC .......... E04F 13/0807; E04F 2201/0146; E04F 2201/0517; E04F 2201/043; E04C 2/34; H02S 20/23; E04B 2/92
USPC ....................................................... 52/588.1
See application file for complete search history.

(56) References Cited

U.S. PATENT DOCUMENTS

| 2,116,530 | A | 5/1938 | McCabe |
| 2,399,151 | A | 4/1946 | Tickle, Jr. |
| 2,490,663 | A | 12/1949 | Van Uum et al. |
| 4,736,565 | A | 4/1988 | Bisson |
| 5,459,810 | A | 10/1995 | Villa |
| 2015/0040493 | A1 | 2/2015 | Kuo et al. |
| 2015/0204072 | A1 | 7/2015 | Spear |

FOREIGN PATENT DOCUMENTS

GB    1054412 A    1/1967

OTHER PUBLICATIONS

PCT; App. No. PCT/AU2019/050588; International Search Report and Written Opinion dated Aug. 28, 2019.
CNIPA; Chinese Patent Application No. 2019800489930; First Office Action dated Dec. 24, 2021.
EPO; Application No. EP 19814007.1; Partial Supplementary European Search Report and Opinion dated Jan. 17, 2022.
EPO; Application No. EP 19814007.1; Extended European Search Report and Opinion dated Apr. 21, 2022.

*Primary Examiner* — Beth A Stephan
(74) *Attorney, Agent, or Firm* — Fitch, Even, Tabin & Flannery LLP (57) ABSTRACT

A panel (assembly) having an inner panel member (sheet) and an outer panel member (sheet), with the member being secured to the member so that the member applies an outward force to the first member.

5 Claims, 9 Drawing Sheets

BUILDING PANEL

CROSS-REFERENCE TO RELATED APPLICATIONS

This application is a U.S. national phase application of International Application No. PCT/AU2019/050588, filed Jun. 7, 2019, which claims priority to Australian Application No. 2018902054, filed Jun. 7, 2018.

FIELD

The present invention relates to panels for buildings and assemblies for securing the panels to the building.

BACKGROUND

The present invention relates to facades and roof assemblies to be applied to buildings, and more particularly but not exclusively to pressure equalizing or vented facades, and roof assemblies adapted to support and integrate solar and other active panel modules.

Panel assemblies applied to buildings, particularly multi-storey buildings, have a number of disadvantages including complexity in respect of insulation, deformation of the panels due to heat, and in respect of vented facades, the risk of fire travelling up between the outer surface of the building and the façade.

A disadvantage of known assemblies used to mount solar panels on building roofs is that they are limited in scope and performance, and are also difficult and time consuming to install.

OBJECT

It is the object to the present invention to overcome or substantially ameliorate at least one of the above disadvantages.

SUMMARY OF INVENTION

There is firstly disclosed herein a panel assembly including:

a first sheet member of generally rectangular configuration having a first and a second edge portion, the edge portions being generally parallel and transversely spaced, and a third and a fourth edge portion, the third and fourth edge portions being generally parallel and transversely spaced and generally perpendicular to the first and second edge portions, a central sheet part extending between the edge portions, with at least the first and the second edge portion extending from the central part in a direction generally transverse relative of the central part;

a second sheet member of generally rectangular configuration having a first and a second edge portion, the edge portions of the second member being generally parallel and transversely spaced, and a third and a fourth edge portion, the third and fourth edge portions of the second sheet member being generally parallel and transversely spaced and generally perpendicular to the first and second edge portions of the second sheet member, a central sheet part extending between the edge portions of the second sheet member, with at least the first and second edge portions of the second sheet member extending from the central part of the second sheet member in a direction generally transverse relative to the central part of the second sheet member; and wherein the first and second edge portions of the first sheet member engaged with the first and second portions of the second sheet member, with the first and second edge portions of the first sheet member being located between the first and second edge portions of the second sheet member and being engaged therewith to apply outward forces to the second sheet member so that the central part of the second sheet member is under tension.

Preferably, the first and second edge portions of the first sheet member are resiliently deformed so as to engage the first and second edge portions of the second sheet member to tension the central part of the second sheet member.

Preferably, the first and second edge portions of the first and second sheet member are intended to be horizontally oriented, with the first and second edge portions of the first sheet member each having at least one aperture, and the first and second edge portions of the second sheet member have tabs which engage in the apertures.

Preferably, the tabs resiliently deform to snap engage in their respective apertures to secure the first sheet member to the second sheet member.

Preferably, the first edge portions of the first sheet member overlay the first edge portions of the second sheet member so that the central part of the first sheet member is spaced from the central part of the second sheet member, so that the panel assembly encompasses a space.

Preferably, the central part of the first sheet member is provided with a plurality of ribs extending generally parallel to the second edge portions of the first sheet member.

There is further disclosed herein a mounting assembly to secure a panel to a wall member, the assembly including:

a first mounting bracket to be fixed to the wall member, the first mounting bracket being adjustable in position relative to the wall member in a generally horizontal first direction, and providing a generally horizontal bracket portion, to extend generally outwardly away from the wall member;

a second mounting bracket attached to the bracket portion and adjustable in position relative to the bracket portion in a generally horizontal second direction and normal to the first direction; and a stud member attached to the second mounting bracket, and secured thereto in a desired position relative to the second bracket.

Preferably, the elongated mounting member horizontally extending slots to provide for adjustment relative to the wall member in the generally horizontal first direction, and the second mounting bracket has a plurality of slots to provide for adjustment in said second direction.

Preferably, the stud member is a channel member within which the second mounting bracket projects.

Preferably, the assembly further includes a cap fixed to a lower portion of the stud member.

There is still further disclosed herein a plate and mounting assembly including:

an elongated mounting member having a pair of generally parallel longitudinally extending flanges that are transversely spaced, each flange having a plurality of apertures located at spaced locations longitudinally along the flange; at least one plate attached to the elongated member, and having a clip part that when inserted through a respective one of the apertures is resiliently deformed to provide for attachment of the plate to the member, with the clip when engaged with the member preventing removal of the plate from the member in a direction transverse of the member, without deformation of the clip.

There is still further disclosed herein a mounting assembly to secure a plurality of panels to a wall, the assembly including:

a mounting bracket to be fixed to the wall so as to be generally upright and to which the panels are to be attached so as to be spaced from the wall thereby providing a cavity between the wall and the panels; and a strip extending between the members adjacent lower portions thereof so as to extend between the panels and the wall and to at least substantially close said cavity at a lower portion of the cavity.

Preferably, the strip includes apertures through which air may pass so that air can pass through the cavity.

Preferably, the strip is a polymer that expands when heated, so that when heated the passages are at least substantially closed.

Preferably, the strip includes a backing member that extends longitudinally of the strip.

BRIEF DESCRIPTION OF DRAWINGS

Preferred forms of the present invention will now be described by way of example with reference to the accompanying drawings wherein.

DESCRIPTION OF EMBODIMENTS

In FIGS. 1 to 8 of the accompanying drawings there is schematically depicted a plurality of panels 10. Each of the panels 10 is an assembly. The panels 10 are fixed to a building that includes a building member 12, with the panels 10 forming an outer skin of the building.

Figure 1:
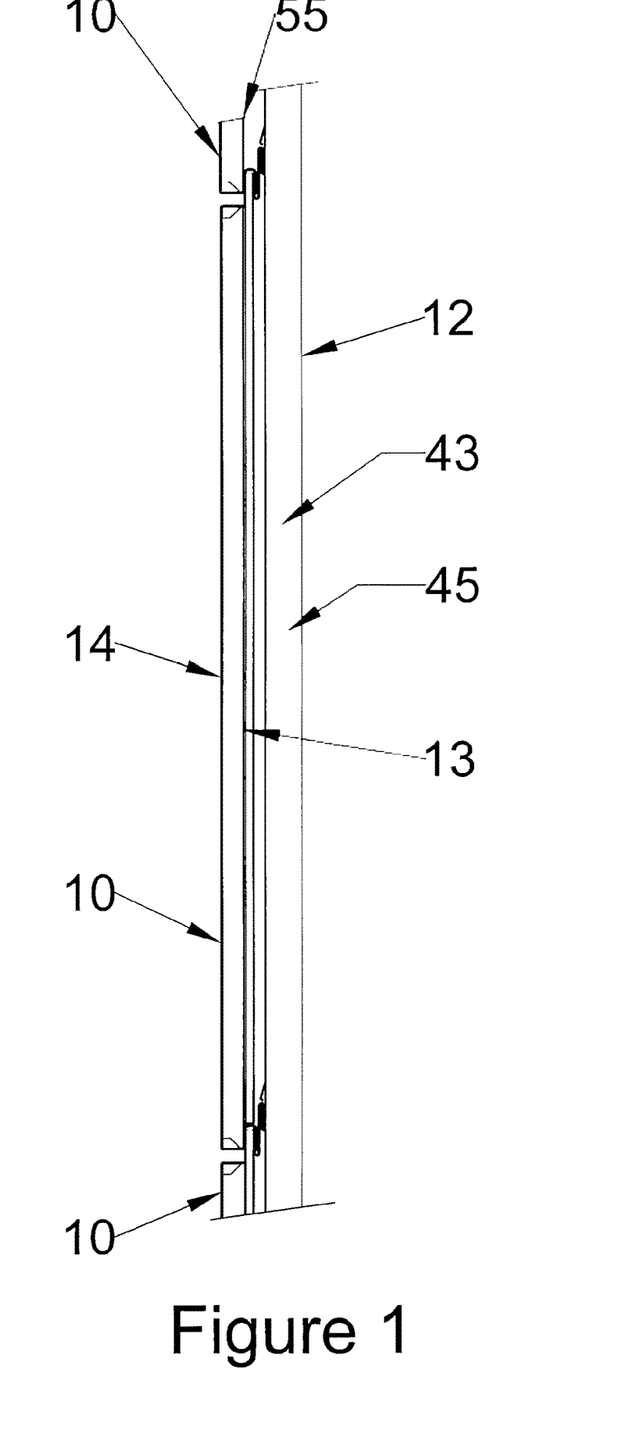
FIG. 1 is a schematic side elevation of a panel assembly attached to a portion of a building.

The panels 10 are arranged in vertical arrays and horizontal arrays.

Each of the panels 10 includes an inner panel member (sheet) 13 and an outer panel member (sheet) 14.

The outer panel member 14 has a pair of generally horizontally extending edge portions 15, and a pair of generally vertically extending edge portions 16. Adjacent edge portions 16 of adjacent panels 10 are joined by a joining strip 56.

The edge portions 15 and 16 provide the outer panel 14 with a generally rectangular configuration, with the longitudinal edge portions 15 having a greater length than the edge portions 16.

The edge portions 15 and 16 surround a generally central panel part 17 of the outer panel member 14.

Figure 2:
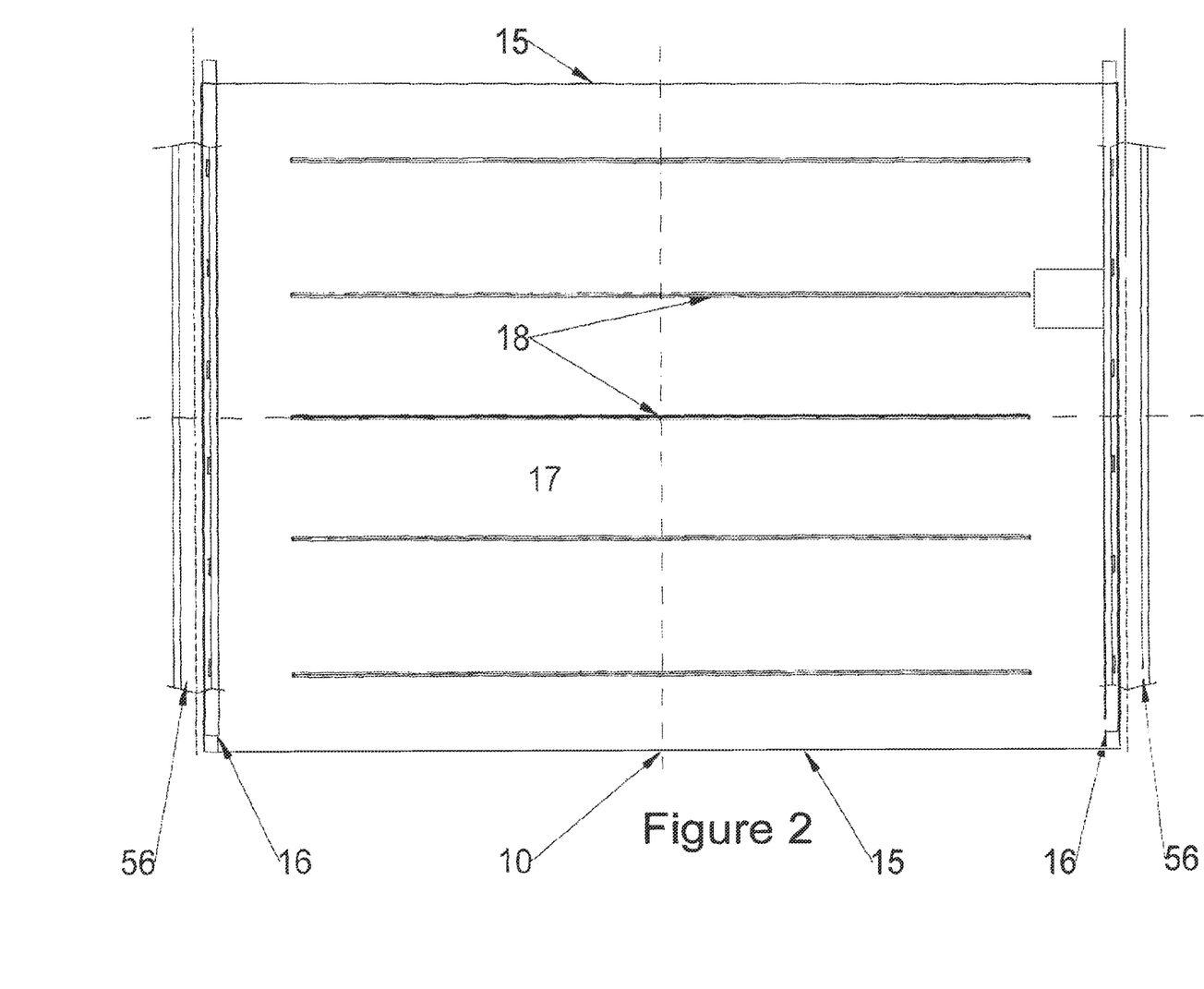
FIG. 2 is a schematic rear elevation of one of the panels of FIG. 1.
Figure 3:
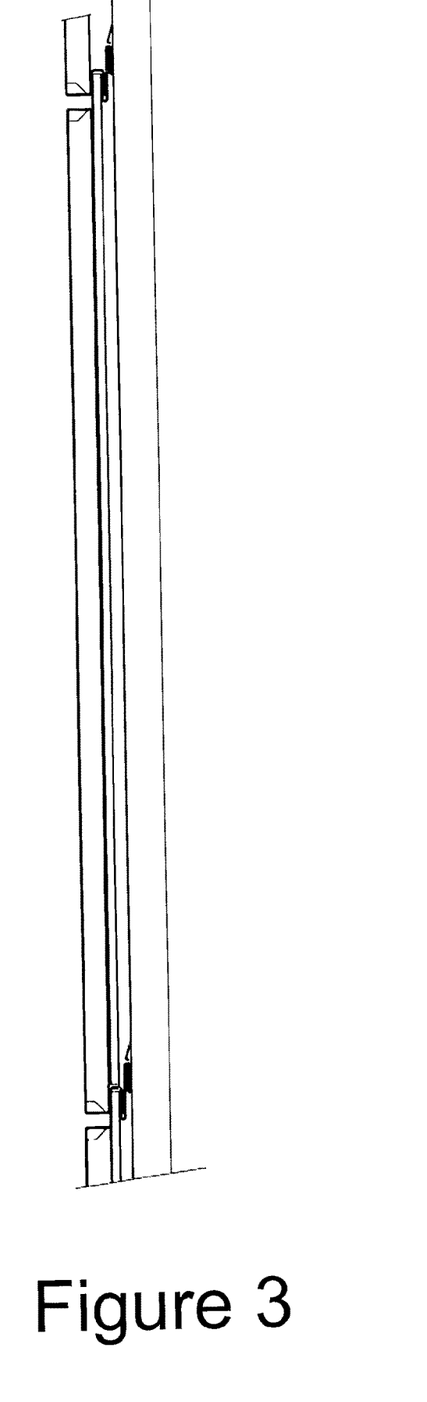
FIG. 3 is a schematic top plan view of the panel as shown in FIG. 2.

In one preferred form, the central panel part 17 is deformed so as to have a plurality of longitudinally extending ribs 18 to stiffen the central panel parts 17. The inner side of the panel 14 is shown in FIG. 2, with the inner panel 13 removed.

The inner panel member 13 includes horizontally extending edge portions 19, and vertically extending edge portions 20, with the edge portions 19 and 20 providing the inner panel 13 with a generally rectangular configuration in which the edge portions 19 are longer than the edge portions 20. The edge portions 19 and 20 surround a generally central panel part 21.

Each of the edge portions 19 is provided with an aperture 22, and each of the edge portions 15 a tab 23, with the apertures 22 and tabs 23 located so that when the panel members 14 and 15 are coupled, the tabs 23 project into the apertures 22. During assembly, the tabs 23 are resiliently deformed, and snap engage within an associated one of the apertures 22 when the panel members 13 and 14 are correctly positioned relative to each other. The tabs 23 then secure the panel members 13 and 14 together. The edge portions 19 overly a respective edge portion 15 so that the central panel parts 17 and 21 are spaced so that each panel 10 encloses a space 81.

During coupling of the panel members 13 and 14, the edge portions 19 are resiliently deflected inwardly toward each other, while the edge portions 15 are resiliently deflected apart due to engagement with the edge portions 19. This resiliently deflection of the edge portions 15 places the panel part 17 in tension.

Figure 6:
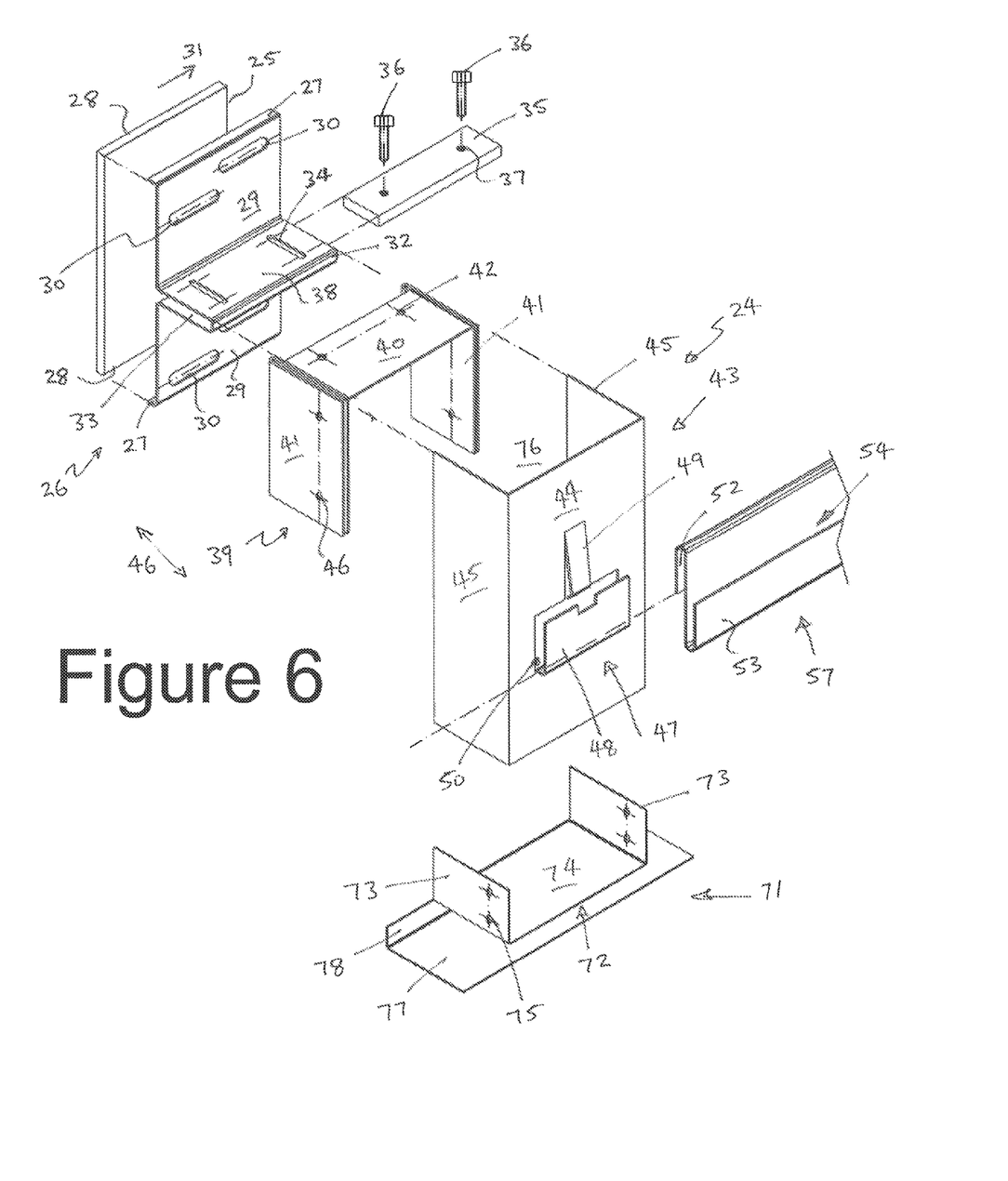
FIG. 6 is a schematic parts exploded isometric view of a mounting assembly for the panels of FIG. 1.

The panels 10 are secured to a building by a mounting assembly 24. The assembly 24 is fixed to the member 12 of the building.

The assembly 24 includes a base 25 that may be an elongated member forming part of the building 12. Fixed to the base 25 is a first bracket 26. The bracket 26 has upper and lower flanges 27 that engage edge surfaces 28 so that the bracket 26 is prevented from moving vertically relative to the base 25, but can move horizontally relative to the base 25.

The bracket 26 further includes plate portions 29 that extend from the flanges 27, and that are provided with elongated apertures 30. The apertures 30 are longitudinally elongated in a generally horizontal direction, and through which fasteners pass to engage the base 28. Accordingly, the fasteners, until tension, allow relative movement between the bracket 26 and the base 25 in a generally horizontal direction.

The plate portions 29 are generally planar and extend in a generally vertical plane. The plate portions 29 extend from the flanges 27 to a channel part 32 that is of a "U" transverse cross section so as to provide a slot 33 open towards the base 25.

The part 32 is also provided with slots 34 that extend generally horizontally, and are generally perpendicular to the base 25.

Located in the slot 33 is a clamp bracket 35, with threaded fasteners 36 passing through the slot 34 to engage threaded passages 37 in the bracket 35.

With the bracket 35 located in the slot 33, the threaded fasteners 36 pass through the slots 34 to threadably engage in the passages 37.

Supported on the upper surface 38 of the part 32 is a "U" shaped further bracket 39 that has a base 40 from which there depends a pair of flanges 41, with the flanges 41 being located on either side of the part 32.

The base 40 has a pair of apertures 42 through which the threaded fasteners 36 pass.

With the bracket 39 resting on the surface 38, the threaded fasteners 36 pass through the apertures 42, the slots 34 to threadably engage in the passages 37. Upon tensioning of the threaded fastener 36, the bracket 35 clamps the bracket 39 in a fixed position relative to the bracket 26. The elongated slots 34 provide for adjustment of the bracket 39 relative to the bracket 26 in a horizontal direction 40 that is perpendicular to the direction 31 and generally perpendicular to the base 25.

An elongated channel member (stud) 43 that is of a "U" transverse cross section so as to have a longitudinally extending base 44 and slide flanges 45. The channel member 43 is placed over the bracket 39 so as to be located between the flanges 45. Thereafter, threaded fasteners can pass through the flanges 45 to engage in passages apertures 46 in the flanges 41 to secure the channel member 43 to the bracket 39. The channel member 43 is closed at its lower end by a cap 71. A plurality of members 43 would be fixed to the member wall at horizontally spaced portions.

The channel member 43 has a mounting projection 47 that includes an upwardly projecting flange 48 that is spaced outwardly relative to the remainder of the flange 44. Located above the flange 48 is a resilient tab 49.

Behind the flange 48 is a slot 50 that is upwardly open, and that receives a mounting strip 51. The mounting strip 51 is of a "S" transverse configuration, so as to have a downwardly extending flange 52 that is received within the slot 50 to attach the strip 51 to the channel member 43. During insertion of the flange 52 in the slot 50, the tab 49 is resiliently deformed to allow the flange 52 to pass thereby. When the flange 52 is fully inserted in the slot 50, the flange 48 is allowed to move outwardly so as to spaced placed above the strip 51 to retain the strip 51 fixed to the slot 50.

The strip 52 also has an upwardly projecting flange 53 providing a slot 54.

Each of the panels 10 is provided with a slot engaging part 55, that is part of the inner panel member 13, that projects downwardly and engages in the slot 34 to fix each of the panels 10 to the mounting strip 51, and therefore the building member 12.

Figure 7:
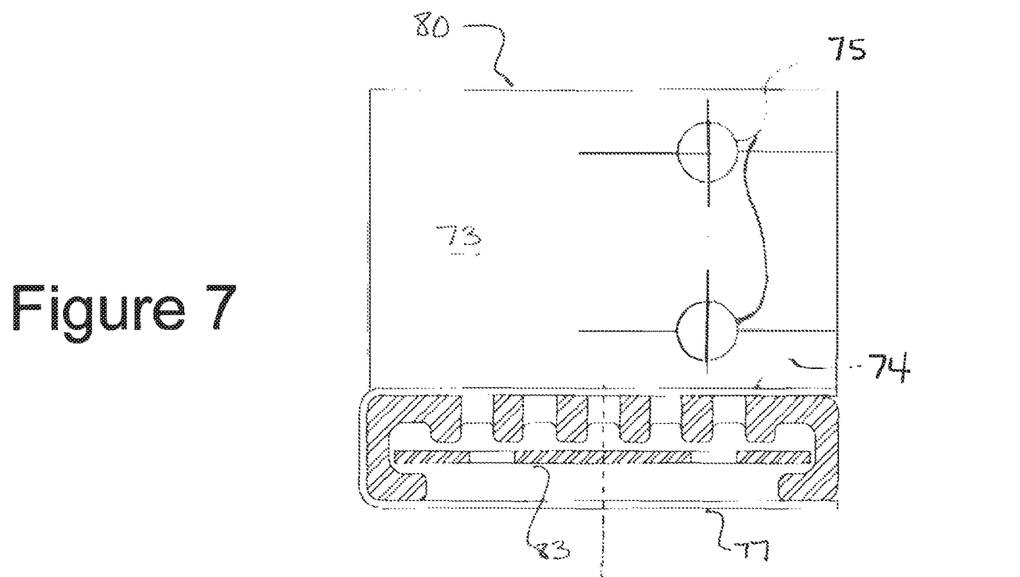
FIG. 7 is a schematic front elevation of portion of the mounting assembly of FIG. 6, provided with a ventilation strip.

The lower portion of the channel member 43 is closed by a cap 71. The cap 71 includes a body 72 that is of a "U" configuration so as to have a pair of flanges 73 joined by a generally planar base 74. The flanges 73 are positioned adjacent the flanges 45, so that threaded fasteners may pass through the apertures 75 in the flanges 73, while also engaging the flanges 75. The base 74 closes the longitudinally extending cavity 76 of the member 43 at the lower end of the member 43.

The cap 71 also has a platform 77 fixed to the base 74 by a lip 78. The platform 77 supports a strip 79 that extends between adjacent members 43 to close the cavity between the panels 10 and the wall.

Figure 8:
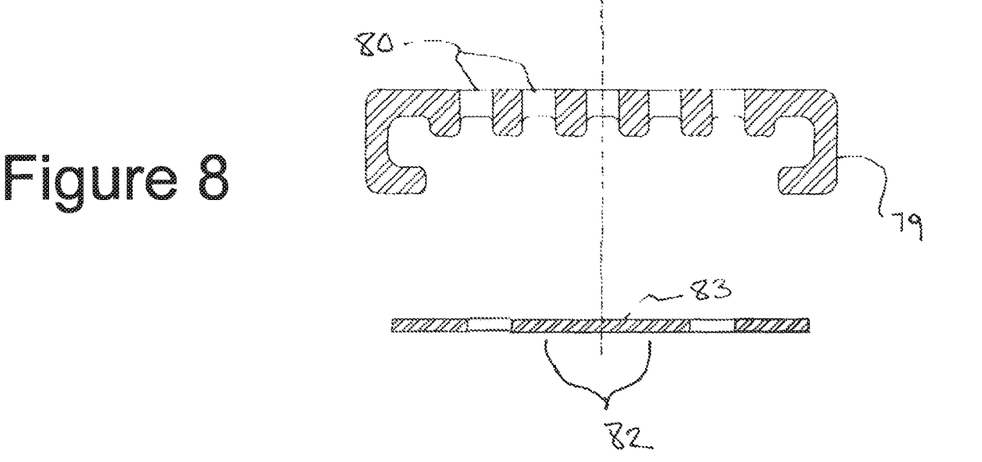
FIG. 8 is a schematic parts exploded view of the ventilation strip of FIG. 7.

The strip 19 has a plurality of passages 80 that provide for the flow of air through cavity between the panels 10 and the wall, however, the strip 79 is formed of a polymer, so that when heated the strip 79 expands to close the passages 80. In one embodiment the strip 79 if formed of plastics material, and may include:

| | | |
|---|---|---|
| PVC resin | 40-60% | |
| Filler | 10-20% | |
| Plasticizer | 10-20% | |
| Stabilizers | 1-2% | |
| Lubricants | 1-2% | |
| Intumescent | 2-8% | (Is both fire retardant & blowing agents) |

Preferably, the strip 79 is at least partly supported by a longitudinally extending metal band 83 secured to the strip 79. Preferably, the band 83 has apertures 82 that provides for air flow through the band 83 and therefore the passages 80.

Figure 4:
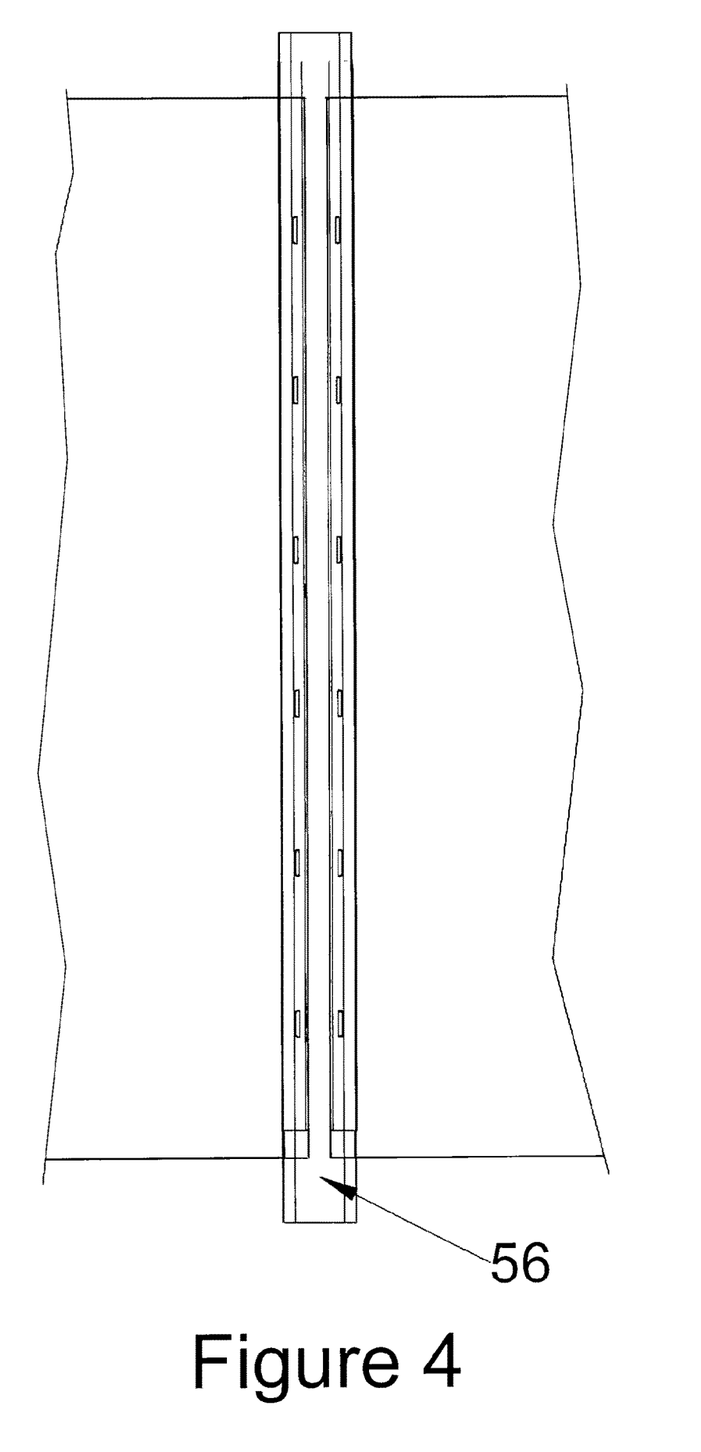
FIG. 4 is a schematic front elevation of a pair of panels, as illustrated in FIG. 1, joined by a joining strip.
Figure 5:
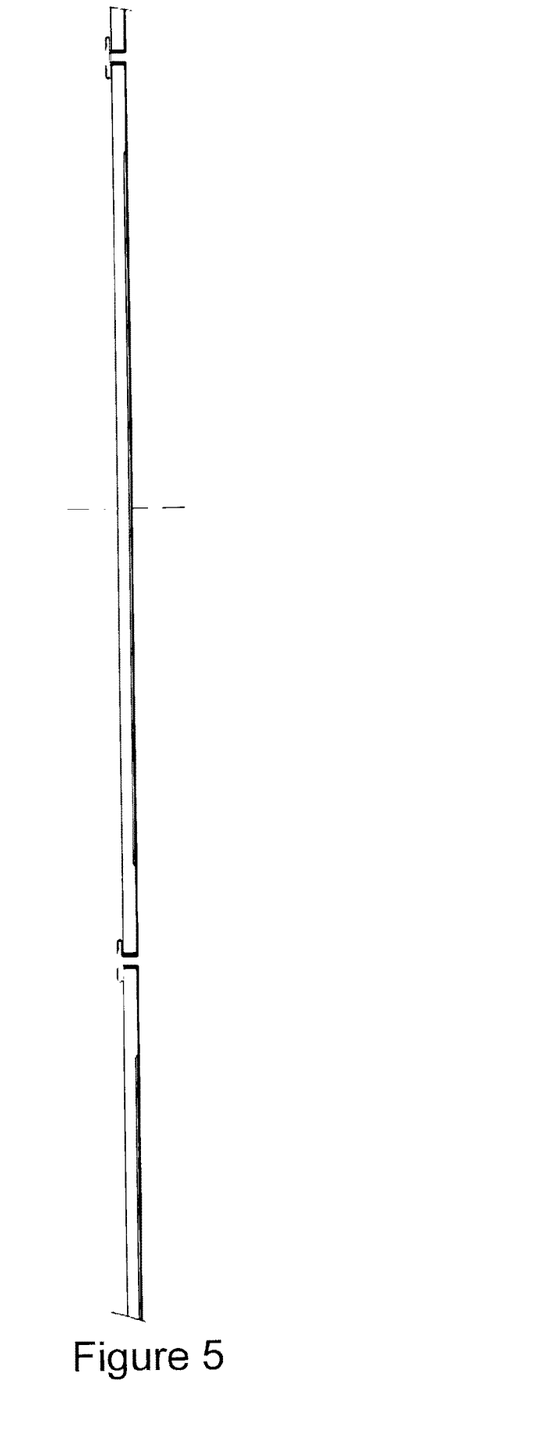
FIG. 5 is a schematic top plan view of the panels of FIG. 1.

Horizontally adjacent panels 10 are secured together by means of the joining strip 56. The joining strip 56 has two "U" shaped edge portions 57, that receive correspondingly shaped edge portions 58 of the inner panel member 13. The edge portions 58 have resilient tabs 59 that when moved past the edge portions 57 deflect to a position preventing relative movement between the panel 10 and the mounting strip 56.

Figure 9:
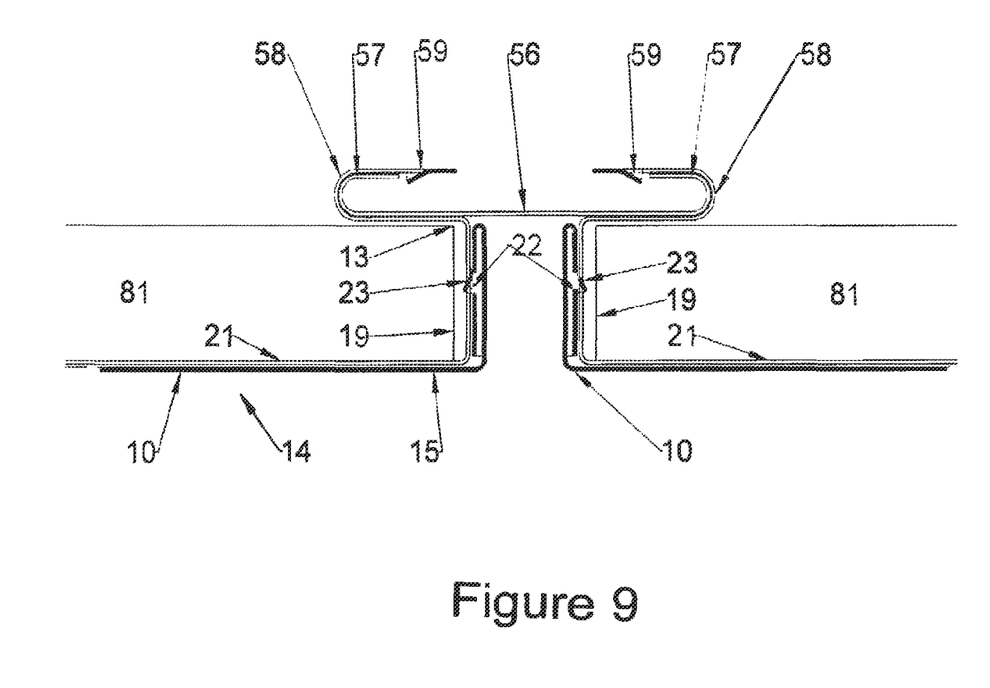
FIG. 9 is a schematic sectioned plan view of a pair of the panels of FIG. 1 secured together by a joining strip.
Figure 10:
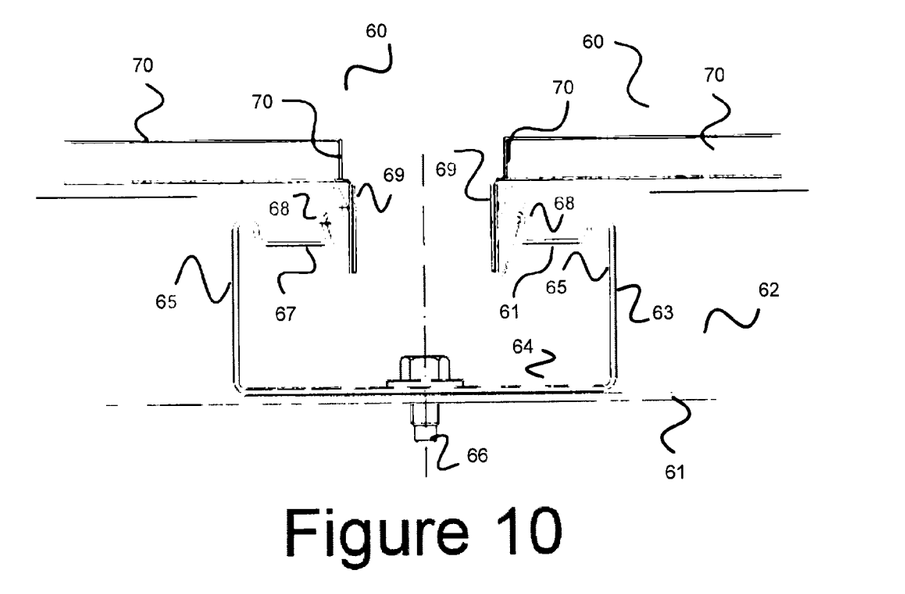
FIG. 10 is a schematic end elevation of a mounting member and a pair of panels.

In FIGS. 9 and 10 there is schematically depicted solar panel mounting plates 60 fixed to a building member 61 that may be a wall or roof member.

Securing the plates 60 to the members 61 is a mounting assembly 62. The mounting assembly 62 includes a channel member 63 that is longitudinally elongated so as to have a longitudinal base 64 and a pair of generally parallel co-extensive side flanges 65. Threaded fasteners 66 pass through the base 64 and secure the channel member 62 to the member 61.

Each of the flanges 65 includes an engaging part 67, with each engaging part including a plurality of apertures 68 that are located at equally spaced positions longitudinally of the channel member 63.

Each of the plates 60 has at least resilient tab 69 that engages in a respective one the aperture 68 to fix the plates 60 to the assembly 62. During installation of the plates 60 with respect to the assembly 62, the tabs 69 resiliently deform until the end portions thereof can be located in the apertures 68.

Each of the plates 60 has side flanges 70 that surround a space that is to receive a solar panel.

When installed on a roof, the channel members 63 act as a gutter.

The invention claimed is:

1. A panel assembly including:
   a first sheet member of generally rectangular configuration having a first and a second edge portion, the edge portions being generally parallel and transversely spaced, and a third and a fourth edge portion, the third and fourth edge portions being generally parallel and transversely spaced and generally perpendicular to the first and second edge portions, a central sheet part extending between the edge portions, with at least the first and the second edge portion extending from the central part in a direction generally transverse relative of the central part;
   a second sheet member of generally rectangular configuration having a first and a second edge portion, the edge portions of the second member being generally parallel and transversely spaced, and a third and a fourth edge portion, the third and fourth edge portions of the second sheet member being generally parallel and transversely spaced and generally perpendicular to the first and second edge portions of the second sheet member, a central sheet part extending between the edge portions of the second sheet member, with at least the first and second edge portions of the second sheet member extending from the central part of the second sheet member in a direction generally transverse relative to the central part of the second sheet member; and wherein the first and second edge portions of the first sheet member engaged with the first and second portions of the second sheet member, with the first and second edge portions of the first sheet member being located between the first and second edge portions of the second sheet member and being engaged therewith to apply outward forces to the second sheet member so that the central part of the second sheet member is under tension;

wherein the first and second edge portions of the first sheet member are resiliently deformed so as to engage the first and second edge portions of the second sheet member to tension the central part of the second sheet member.

2. The panel assembly of claim 1, wherein the central part of the first sheet member is provided with a plurality of ribs extending generally parallel to the second edge portion of the first sheet member.

3. The panel assembly of claim 1, wherein the first and second edge portions of the first and second sheet member are intended to be horizontally oriented, with the first and second edge portions of the first sheet member each having at least one aperture, and the first and second edge portions of the second sheet member have tabs which engage in the apertures.

4. The panel assembly of claim 3, wherein the tabs resiliently deform to snap engage in their respective apertures to secure the first sheet member to the second sheet member.

5. The panel assembly of claim 1, wherein the first edge portion of the first sheet member overlays the first edge portion of the second sheet member so that the central part of the first sheet member is spaced from the central part of the second sheet member, so that the panel assembly encompasses a space.

\* \* \* \* \*